United States Patent
Bier et al.

(10) Patent No.: US 12,158,414 B2
(45) Date of Patent: Dec. 3, 2024

(54) PLURALITY OF STRUCTURALLY IDENTICAL SPECTROMETERS AND A CALIBRATION METHOD THEREFOR

(71) Applicant: CARL ZEISS SPECTROSCOPY GMBH, Jena (DE)

(72) Inventors: Clemens Michael Bier, Eisleben (DE); Torsten Büttner, Jena (DE); Michael Barth, Erfurt (DE); Felix Kerstan, Jena (DE)

(73) Assignee: CARL ZEISS SPECTROSCOPY GMBH, Jena (DE)

( * ) Notice: Subject to any disclaimer, the term of this patent is extended or adjusted under 35 U.S.C. 154(b) by 188 days.

(21) Appl. No.: 18/009,764

(22) PCT Filed: Jun. 8, 2021

(86) PCT No.: PCT/EP2021/065264
§ 371 (c)(1),
(2) Date: Dec. 12, 2022

(87) PCT Pub. No.: WO2021/254825
PCT Pub. Date: Dec. 23, 2021

(65) Prior Publication Data
US 2023/0243741 A1    Aug. 3, 2023

(30) Foreign Application Priority Data
Jun. 18, 2020   (DE) ............. 10 2020 116 094.1

(51) Int. Cl.
*G01N 21/25*    (2006.01)
*G01J 3/28*     (2006.01)
(Continued)

(52) U.S. Cl.
CPC .............. *G01N 21/274* (2013.01); *G01J 3/28* (2013.01); *G01N 21/359* (2013.01)

(58) Field of Classification Search
None
See application file for complete search history.

(56) References Cited

U.S. PATENT DOCUMENTS 11,340,110 B2 *   5/2022   Green ................ G01J 3/027
2009/0079977 A1 * 3/2009   Lipson ............. A61B 5/1455
                                             356/300

(Continued)

OTHER PUBLICATIONS

Bouveresse E et al: "Assessing the 1-15 Vali Dity of Near-Infrared Monochromator Calibrations Over Time" App Li Ed Spectroscopy, the Society Forapp Li Ed Spectroscopy. Baltimore, us, Bd. 52, Nr. 4, Apr. 1, 1998 (Apr. 1, 1998).

(Continued)

*Primary Examiner* — Hoon K Song
(74) *Attorney, Agent, or Firm* — Stuart H. Mayer; Kaplan Breyer Schwarz LLP

(57) ABSTRACT

In accordance with a method for calibrating structurally identical spectrometers for constituent analysis, a multiplicity of samples are provided and concentrations of one constituent in the individual samples are measured using a reference measuring method. Spectra of the individual samples are measured using one spectrometer selected from the structurally identical spectrometers to determine a preliminary regression model. At least one spectrum is selected from the measured spectra and/or a mean value spectrum formed from the measured spectra. A multiplicity of error spectra are generated using a mathematical model of the structurally identical spectrometers. The individual error spectra are added in each case to the individual selected spectra to obtain simulated spectra. As a result, a resultant regression model is determined in which amplitude values of the measured spectra and selected simulated spectra form the independent variables and in which the reference measurement values form the dependent variable.

15 Claims, 1 Drawing Sheet

(51) Int. Cl.
   *G01N 21/27*      (2006.01)
   *G01N 21/359*     (2014.01)

(56) References Cited

U.S. PATENT DOCUMENTS

2015/0160121 A1    6/2015  Ridder
2019/0305845 A1*  10/2019  Cyr ................. H04B 10/07955
2022/0276092 A1*   9/2022  Zhao .................... G01N 21/274
2023/0070822 A1*   3/2023  Nakamura .............. F16H 59/14

OTHER PUBLICATIONS

Despagne F et al: "Transfer of Calibrations of Near-Infrared Spectra Using Neural Networks", Applied Spectroscopy, The Society for Applied Spectroscopy. Baltimore, US, Bd. 52, Nr. 5, May 1, 1998 (May 1, 1998).

\* cited by examiner

PLURALITY OF STRUCTURALLY IDENTICAL SPECTROMETERS AND A CALIBRATION METHOD THEREFOR

CROSS-REFERENCE TO RELATED APPLICATION

This application is a 371 National phase application in the United States of PCT/EP2021/065264, filed Jun. 8, 2021, which claims the benefit of German application No. 10 2020 116094.1, filed Jun. 18, 2020, the contents of which are incorporated herein by reference.

BACKGROUND OF THE INVENTION

The present invention relates first to a method for calibrating a plurality of structurally identical spectrometers for ingredient analysis. By calibrating, it should be possible to accurately measure the concentration of a specific ingredient in samples to be measured with the individual spectrometers. The calibration process comprises at least the provision of a regression model that is to be used to determine the concentrations of the ingredient based on the spectra of the sample which are measured with the spectrometers. Furthermore, the invention relates to a plurality of structurally identical spectrometers for ingredient analysis.

DE 601 14 036 T2 shows a method for characterizing spectrometer instruments according to the instrumental variation present between the instruments or according to the variation over time within the same instrument. A plurality of spectra of known standards of at least one spectrometer instrument are provided. The at least one spectrometer instrument is classified into at least one of a plurality of predefined clusters based on spectral features extracted from the at least one spectrum. At least one calibration model is provided for each of the predefined clusters. Each calibration model compensates for the instrumental variation of instruments classified into the respective cluster.

The article by Workman JR, J. J.: "A Review of Calibration Transfer Practices and Instrument Differences in Spectroscopy" in Applied Spectroscopy, vol. 72(3), 2018, pages 340 to 365, DOI: 10.1177/0003702817736064, gives an overview of methods for transferring calibration models between spectrometers.

DE 696 08 252 T2 shows a method for standardizing a multiplicity of spectrometers.

From EP 1 998 155 A1 a method for wavelength calibration of a spectrometer is known, which is based on the principle of a stepwise relative displacement of corresponding measurement value blocks of a model and calibration spectrum.

DE 101 52 679 A1 teaches a method for the fully automatic transfer of calibrations of optical emission spectrometers.

DE 10 2004 061 178 A1 shows a method for the fully automatic transfer of calibrations between spectrometers. The spectrometers comprise spectrometer optical units with positionable slits.

DE 692 11 163 T2 shows a method for calibrating a spectral instrument to determine a value of a property of an unknown sample by using constants in a second calibration equation for the instrument by reference to a spectral instrument having a first calibration equation. A value of a dependent first variable corresponding to each member of a set of calibration transfer standards is determined from the first calibration equation based on first spectral data for each member of the set of calibration transfer standards. Second constants in the second calibration equation are determined such that the sum of the absolute differences between each stated value of the independent second variable for each member of the set of calibration transfer standards is minimized using second spectral data measured by the instrument and that corresponding value of the dependent first variable that was determined for each member of the set of calibration transfer standards determined by the first calibration equation. The values of the stated property in the unknown sample are determined using the instrument.

The calibration of a spectrometer for ingredient analysis is complex due to the use of a reference measurement method for determining the concentration of the respective ingredient, since the reference measurement method usually requires a chemical analysis. It is therefore desirable not to have to calibrate every individual example of a mass-produced spectrometer type with regard to the ingredient analysis. For this purpose, a calibration carried out as an example must be designed to be robust with respect to small differences in the production of the spectrometers. This question is becoming ever more important for manufacturers and calibrators, especially against the background that miniaturized spectrometers are increasingly being installed as sensors. With large numbers of spectrometers as measurement sensors, not every individual product on every individual device can be compared to the reference measurement method to be carried out in a laboratory. According to the prior art, a larger number of spectrometers are used for calibrations in order to minimize the influence of the individual devices. In order to achieve a high inter-instrument agreement (IIA), a selection of spectrometers for calibration work must be available, which involves a corresponding amount of effort. However, in process engineering applications, where samples are taken from the process after the spectrum has been recorded, this is almost impossible. In addition, it is not possible to subsequently optimize calibrations with a view to improving the IIA, as this would require new samples and a multiplicity of spectrometers.

SUMMARY OF THE INVENTION

Proceeding from the prior art, the object of the present invention consists of being able to improve without much effort the inter-instrument agreement (IIA) of spectrometers for ingredient analysis.

The stated object is achieved by a method as claimed in appended claim 1 and by a plurality of structurally identical spectrometers as claimed in appended coordinate claim 15.

The method according to the invention is used to calibrate a plurality of structurally identical spectrometers. The structurally identical spectrometers are used for ingredient analysis. The calibration takes place with regard to the ingredient analysis, i.e., the determination of the concentration of an ingredient in a sample based on a spectrum measured on the sample. The spectrometers are structurally identical at least with regard to the measurement signal recording and measurement signal processing, with the spectrometers being able to differ with regard to those properties that do not affect the measurement signal recording and measurement signal processing, such as the design of a housing or a plug connector. The structurally identical spectrometers are preferably of the same type.

The spectrometers are, for example

NIR spectrometers, VIS/NIR spectrometers, or full-range spectrometers. The spectrometers can have a transmission design, a transflection design, or a reflection design. The spectrometers can be, for example, monochromator-based spectrometers, interferometer-based spectrometers, filter-based spectrometers, or MEMS spectrometers.

The calibration process comprises at least the provision of a regression model that is to be used to determine the concentrations of the ingredient based on the spectra of the sample which are measured with the spectrometers. In this respect, the method is used at least to provide a regression model for calibrating a plurality of structurally identical spectrometers for ingredient analysis.

In one step of the method, a multiplicity of samples are provided. The samples contain an ingredient in different concentrations. This is the ingredient for whose measurement the spectrometers are to be calibrated. Preferably at least ten of the samples and more preferably at least 100 of the samples are provided. Preferably between 50 and 500 of the samples are provided. The samples were taken from a material or a product which is to be examined with regard to its content using the spectrometer. The material or the product is preferably an agricultural product, fresh food, or processed food. The agricultural product is preferably harvested produce. The spectrometers are preferably configured to measure the concentration of the at least one ingredient of the agricultural product or of the foodstuff on an agricultural vehicle, in an agricultural machine, or in a food production process. The ingredient is preferably water, a protein, an oil, sugar, starch, or crude fiber. Measuring the concentration of water represents a moisture measurement.

In a further step of the method, the concentrations of the ingredient in the individual samples are measured using a reference measurement method so that reference measurement values for the concentrations of the ingredient are obtained. The reference measurement method leads to precise measurement values for the concentrations of the ingredient in the individual samples. The reference measurement method is preferably a chemical analysis method. The chemical analysis method is preferably a wet chemical analysis method.

In a further step of the method, spectra of the individual samples are measured with a spectrometer selected by way of example from the structurally identical spectrometers. The spectra are preferably absorption, transmission, and/or reflection spectra. In the samples, the spectra are measured in each case according to the same measurement principle.

The spectra are preferably measured in the infrared range, in the visible range, and/or in the ultraviolet range of the electromagnetic spectrum. The spectra are preferably measured in the near-infrared range of the electromagnetic spectrum. The spectra are measured over a wavelength range preferably of at least 100 nm and more preferably at least 300 nm in size. The spectra are preferably measured by measuring amplitudes at selected wavelengths. The amplitudes are preferably measured at at least 10 selected wavelengths. More preferably, the amplitudes are measured at at least 100 selected wavelengths. More preferably, the amplitudes are measured at at least 300 selected wavelengths.

The spectrometer selected as an example is structurally identical to the other structurally identical spectrometers. The spectrometer selected as an example preferably has a mean error.

In a further step of the method, a preliminary regression model is determined, in which the amplitude values of the measured spectra form the independent variables and in which the reference measurement values of the concentrations of the ingredient form the dependent variable. The result is a mathematical function being available that describes the dependence of the concentration of the ingredient on the amplitude values of the spectrum. The preliminary regression model preferably has at least one further dependent variable, which describes a physical or chemical property of the samples.

In a further step of the method, at least one spectrum is selected from a set of spectra, wherein this set comprises the measured spectra and an average spectrum formed from the measured spectra. The selection is made according to a suitability for predicting the concentration of the ingredient, in particular in the respective sample. One to ten spectra are preferably selected from the measured spectra and/or the average spectrum formed from the measured spectra.

The step of selecting at least one spectrum from the measured spectra and/or an average spectrum formed from the measured spectra preferably comprises one or both of the two sub-steps described below. According to one sub-step, the preliminary regression model is applied to the measured spectra in order to obtain a prediction value for the concentration of the ingredient in the respective sample, wherein that measured spectrum or those measured spectra is/are selected for which the prediction value comes closest to the reference measurement value of the respective sample. Thus, those measured spectra are selected which are as close as possible to the regression line of the preliminary regression model. According to another sub-step, the average spectrum is selected. The average spectrum is preferably formed from the measured spectra by averaging the amplitude values of the measured spectra for each of the selected wavelengths, for example by arithmetic averaging. A reference measurement value for the concentration of the ingredient, which was determined by applying the preliminary regression model to the average spectrum, is assigned to the average spectrum.

In a further step of the method, tolerances of components of the structurally identical spectrometers are simulated multiple times using a mathematical model of the structurally identical spectrometers in order to obtain a multiplicity of error spectra. The mathematical model of the structurally identical spectrometers describes the components of the structurally identical spectrometer; especially the optical and electronic components. In particular, the mathematical model describes error properties, specifically the tolerances of the components that occur, so that the mathematical model is suitable for calculating a maximum error for the correctness of each wavelength and the associated amplitude of the transmission, reflection, and/or absorption. Based on these maximum errors of the individual selected wavelengths, the possible error spectra for the ideal spectrometer are simulated. The error spectra represent difference spectra. At least 100 simulations are preferably carried out, with the result that at least 100 error spectra are obtained. More preferably, at least 500 simulations are carried out, with the result that at least 500 error spectra are obtained.

In a further step of the method, the individual error spectra are each added to the selected spectrum or to the individual selected spectra in order to obtain simulated spectra. The simulated spectra are spectra that could actually be measured with the structurally identical spectrometers, since they are based on spectra which are actually measured with the structurally identical spectrometers and, in addition, have an error component that was ascertained by way of simulation with the mathematical model of the structurally identical spectrometers. The addition of the individual error spectra in each case to the selected spectrum or to the individual selected spectra is preferably carried out in each case for the amplitude values of the selected wavelengths. For example, if the number of error spectra is 1000 and if the number of selected spectra is 1, for example, then the number of simulated spectra obtained is 1·1000=1000. For example, if the number of error spectra is 1000 and if the number of selected spectra is 5, then the number of simulated spectra obtained is 5·1000=5000.

In a further step of the method, the preliminary regression model is applied to the simulated spectra in order to obtain a prediction value for the concentration of the ingredient. The result is a prediction value for the concentration of the ingredient for each of the simulated spectra. That reference measurement value of the concentration of the ingredient that was ascertained for the selected spectrum on which the respective simulated spectrum is based is assigned to the simulated spectra in each case.

In a further step of the method, a number of the simulated spectra is selected, wherein the prediction values obtained for the selected simulated spectra map a variation of the prediction values obtained for the simulated spectra. Those of the simulated spectra which are suitable for contributing to the improvement of the preliminary regression model are thus selected. The number of simulated spectra selected is preferably between 50 and 1000.

In a further step of the method, a resulting regression model is determined, in which amplitude values of the measured spectra and the selected simulated spectra form the independent variables and in which the reference measurement values of the concentrations of the ingredient form the dependent variable. The determination of the resulting regression model differs from the determination of the preliminary regression model only in that the amplitude values of the selected simulated spectra are also taken into account. Thus, the resulting regression model is an improvement over the preliminary regression model, with the result that the resulting regression model represents a calibration that is more robust with respect to errors; in particular with respect to differences due to manufacturing tolerances of the structurally identical spectrometers.

The independent variables of the preliminary regression model and the independent variables of the resulting regression model are each preferably the amplitude values of the measured or selected simulated spectra at selected wavelengths. The independent variables of the preliminary regression model and the independent variables of the resulting regression model are each preferably the amplitude values of the measured or selected simulated ones of the same selected wavelengths. The preliminary regression model and the resulting regression model are preferably each formed by a multilinear regression model. The preliminary regression model and the resulting regression model are preferably determined in each case by a partial least squares regression.

The number of selected simulated spectra is preferably at most 50% of the number of measured spectra. For example, the number of simulated spectra selected is about 75, while the number of measured spectra is about 150. This greatly increases the robustness of the resulting regression model compared with the preliminary regression model.

A particular advantage of the method described is that the calibration of the structurally identical spectrometers for ingredient analysis can be improved by a comparatively low-effort simulation. No measurements with the individual structurally identical spectrometers are required in order to calibrate them individually for the ingredient analysis. By using the mathematical model, the error properties of the structurally identical spectrometers are taken into account. The variance of the structurally identical spectrometers is reduced by up to 30% when using the same model without further adaptations, depending on the product and ingredient.

In preferred embodiments, the method is furthermore configured to use the calibration or the resulting regression model. For this purpose, it comprises a further step in which the resulting regression model is used in the individual structurally identical spectrometers in order to determine in each case the concentration of the ingredient of a sample with the spectrometers based on the spectrum of the sample measured with the respective spectrometer. For this purpose, the resulting regression model is to be loaded into the individual spectrometers in the form of software, which describes the resulting regression model as a mathematical relationship between the concentration of the ingredient and the measured spectrum. Alternatively, the resulting regression model is preferably used in a network. The network comprises the individual structurally identical spectrometers and at least one computing unit. The network represents a data network. The spectrometers and the at least one computing unit are connected to one another via data connections. The at least one computing unit is preferably formed by a computer, in particular by a server. The network preferably comprises a plurality of the computers. The at least one computing unit is used to determine the concentrations of the ingredients of the samples based on the spectra of the samples measured with the spectrometers. The concentrations are therefore preferably determined by cloud computing. For this purpose, the resulting regression model is to be transferred to the at least one computing unit in the form of software, which describes the resulting regression model as a mathematical relationship between the concentration of the ingredient and the measured spectrum.

According to the invention, a plurality of structurally identical spectrometers for ingredient analysis are disclosed below. The individual spectrometers are each configured to determine a concentration of an ingredient of a sample based on a spectrum measured with the respective spectrometer. The individual spectrometers are calibrated using the method described above in that a relationship between a measurement value to be determined for the concentration of the ingredient and the measured spectrum is defined by the resulting regression model. The resulting regression model was preferably determined using one of the preferred embodiments of the method described above.

The plurality of structurally identical spectrometers preferably comprises at least 100 of the structurally identical spectrometers and more preferably at least 1000 of the structurally identical spectrometers.

The spectrometers preferably also have features that are described above in connection with the method.

DESCRIPTION OF THE DRAWINGS

Further details and developments of the invention will become apparent from the following description of preferred embodiments of the invention, with reference being made to the drawing. The figures show in.

DETAILED DESCRIPTION OF THE INVENTION

Figure 1:
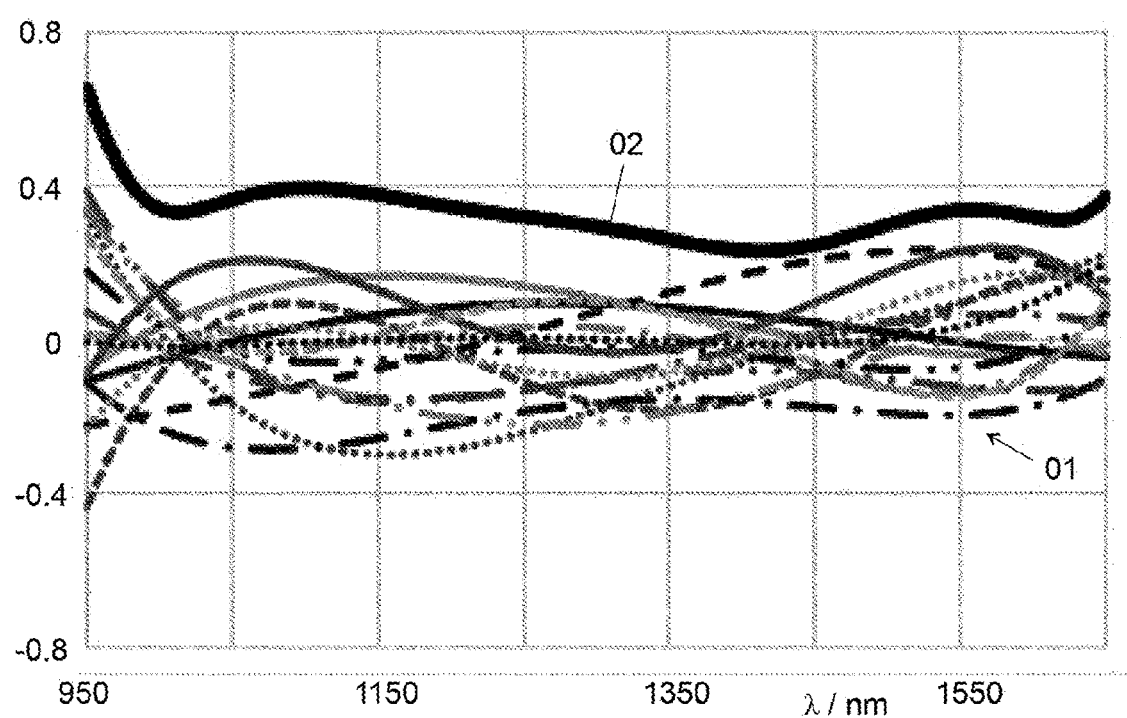
FIG. 1 is a diagram for illustrating error spectra which were generated according to a preferred embodiment of a method according to the invention.

FIG. 1 shows a diagram for illustrating error spectra 01 which were generated according to a preferred embodiment of a method according to the invention. The error spectra 01 were each generated by simulating tolerances of components of structurally identical spectrometers to be calibrated for ingredient analysis using a mathematical model, wherein the mathematical model depicts one of the many structurally identical spectrometers. The x-axis of the diagram represents the wavelength $\lambda$. Plotted on the y-axis of the diagram is the deviation, i.e. the error which is obtained when respectively applying the mathematical model in comparison with a predetermined value of the wavelength. An ideal spectrometer would have an error of zero. The diagram furthermore shows a $3\sigma$ deviation 02 resulting from the mathematical model. The error spectra 01 are used in order to be able to develop a regression model for the calibration of the many structurally identical spectrometers to be calibrated for ingredient analysis that is more robust against errors in the spectrometers.

Figure 2:
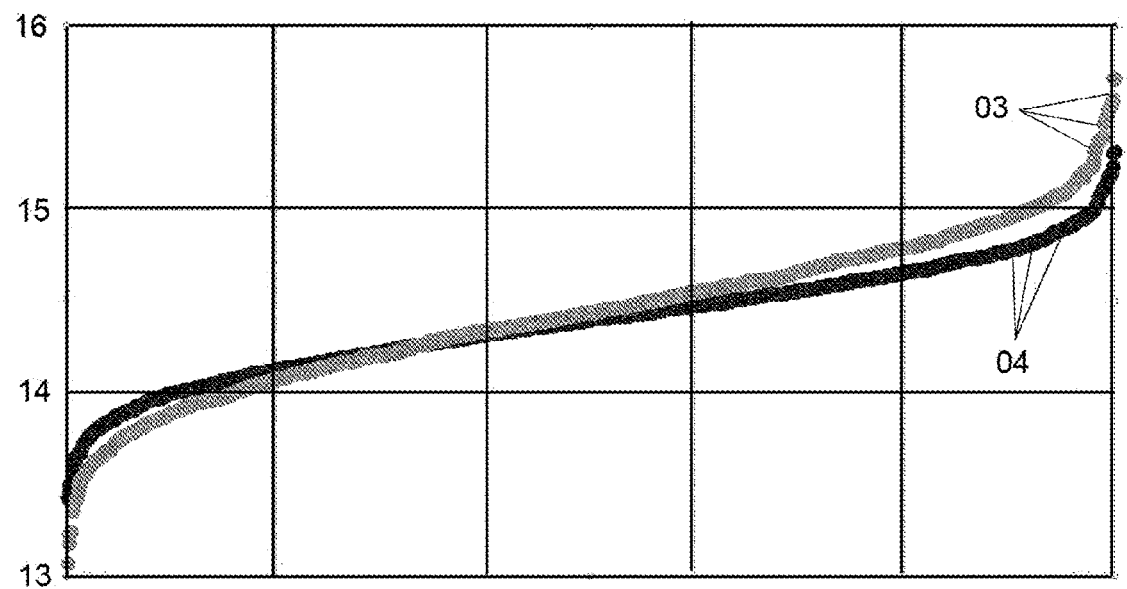
FIG. 2 is a diagram for illustrating prediction values which were determined according to the prior art and according to a preferred embodiment of the method according to the invention.

FIG. 2 shows a diagram for illustrating prediction values 03 which were determined according to the prior art and prediction values 04 which were determined according to a preferred embodiment of the method according to the invention. The multiplicity of spectrometers is plotted on the x-axis. The magnitude of the prediction value of the concentration of an ingredient, which was measured with the respective spectrometer, is plotted on the y-axis. The prediction values 03, 04 are each sorted according to the magnitude of their deviation. The prediction values 04, which were determined according to the preferred embodiment of the method according to the invention, make it clear that the inter-instrument agreement (IIA) has been significantly improved compared to the prior art.

The invention claimed is:

1. A method for providing a regression model for calibrating a plurality of structurally identical spectrometers for ingredient analysis; comprising the following steps:
   providing a multiplicity of samples which contain an ingredient in different concentrations;
   measuring the concentrations of the ingredient in the individual samples using a reference measurement method to obtain reference measurement values for the concentrations of the ingredient;
   measuring spectra of the individual samples with a spectrometer selected by way of example from the structurally identical spectrometers;
   determining a preliminary regression model in which amplitude values of the measured spectra form the independent variables and in which the reference measurement values of the concentrations of the ingredient form the dependent variable;
   selecting at least one spectrum from the measured spectra and/or an average spectrum formed from the measured spectra according to a suitability for predicting the concentration of the ingredient;
   simulating tolerances of components of structurally identical spectrometers multiple times with a mathematical model of structurally identical spectrometers to obtain a multiplicity of error spectra (01);
   adding the individual error spectra (01) respectively to the selected spectrum or to the individual selected spectra to obtain simulated spectra;
   applying the preliminary regression model to the simulated spectra to obtain in each case a prediction value for the concentration of the ingredient;
   selecting a number of the simulated spectra, wherein the prediction values obtained for the selected simulated spectra depict a variation of the prediction values obtained for the simulated spectra; and
   determining a resulting regression model in which amplitude values of the measured spectra and the selected simulated spectra form the independent variables and in which the reference measurement values of the concentrations of the ingredient form the dependent variable.

2. The method as claimed in claim 1, wherein the reference measurement method is a chemical analysis method.

3. The method as claimed in claim 1, wherein the ingredient is water, a protein, an oil, sugar, starch, or a crude fiber.

4. The method as claimed in claim 1, wherein the spectra are measured in the infrared range, in the visible range, and/or in the ultraviolet range of the electromagnetic spectrum.

5. The method as claimed in claim 1, wherein the spectra of the individual samples are measured with the spectrometer selected by way of example from the structurally identical spectrometers over a wavelength range which is at least 300 nm in size, wherein the spectra are measured by measuring amplitudes at at least 10 selected wavelengths.

6. The method as claimed in claim 5, wherein the independent variables of the preliminary regression model are each formed by the amplitude values of the measured spectra at the selected wavelengths, and in that the independent variables of the resulting regression model are each formed by the amplitude values of the selected simulated spectra at the selected wavelengths.

7. The method as claimed in claim 1, wherein the independent variables of the preliminary regression model and the independent variables of the resulting regression model are formed by amplitude values of the spectra at selected wavelengths.

8. The method as claimed in claim 1, wherein the preliminary regression model and the resulting regression model are each formed by a multilinear regression model.

9. The method as claimed in claim 1, wherein the step of selecting at least one spectrum from the measured spectra and/or an average spectrum formed from the measured spectra comprises one or both of the following two sub-steps:
   applying the preliminary regression model to the measured spectra in order to obtain in each case a prediction value for the concentration of the ingredient in the respective sample, wherein that measured spectrum or those measured spectra for which the prediction value comes closest to the reference measurement value of the respective sample is/are selected; and
   selecting the average spectrum.

10. The method as claimed in claim 1, wherein one to ten spectra are selected from the measured spectra and/or the average spectrum formed from the measured spectra.

11. The method as claimed in claim 1, wherein at least 100 simulations for simulating tolerances of components of the structurally identical spectrometers are carried out using the mathematical model of the structurally identical spectrometers, with the result that at least 100 of the error spectra (01) are obtained.

12. The method as claimed in claim 1, wherein the number of the simulated spectra selected is between 50 and 1000.

13. The method as claimed in claim 1, wherein any of claims 1 to 12, characterized in that it comprises the following further step:
using the resulting regression model in the individual structurally identical spectrometers in order to determine the concentration of the ingredient of a sample with the spectrometers based on the spectrum of the sample measured with the respective spectrometer.

14. The method as claimed in claim 1, wherein it comprises the following further step:
using the resulting regression model in a network which comprises the individual structurally identical spectrometers and at least one computing unit, wherein the at least one computing unit is used to determine the concentrations of the ingredient of the samples based on the spectra of the samples measured with the spectrometers.

15. A plurality of structurally identical spectrometers for ingredient analysis, which are each configured to determine a concentration of an ingredient in a sample based on a spectrum measured with the respective spectrometer and which are calibrated using a method as claimed in claim 1, wherein a relationship between a measurement value to be determined for the concentration of the ingredient and the measured spectrum is defined by the resulting regression model.

* * * * *